(12) United States Patent
Sodagar

(10) Patent No.: US 11,496,537 B2
(45) Date of Patent: Nov. 8, 2022

(54) METHOD AND APPARATUS FOR REVERSE ADDRESS MAPPING WHEN USING CONTENT PREPARATION IN 5G NETWORKS

(71) Applicant: TENCENT AMERICA LLC, Palo Alto, CA (US)

(72) Inventor: Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/495,024

(22) Filed: Oct. 6, 2021

(65) Prior Publication Data

US 2022/0329642 A1 Oct. 13, 2022

Related U.S. Application Data

(60) Provisional application No. 63/168,969, filed on Mar. 31, 2021.

(51) Int. Cl.
*H04L 65/75* (2022.01)
*H04L 65/1063* (2022.01)
*H04L 65/1016* (2022.01)
*H04L 65/61* (2022.01)

(52) U.S. Cl.
CPC ........ *H04L 65/762* (2022.05); *H04L 65/1016* (2013.01); *H04L 65/1063* (2013.01); *H04L 65/61* (2022.05)

(58) Field of Classification Search
None
See application file for complete search history.

(56) References Cited

U.S. PATENT DOCUMENTS

| | | | |
|---|---|---|---|
| 9,635,668 B2 | 4/2017 | Golitschek Edler Von Elbwart | |
| 10,552,420 B2* | 2/2020 | Christie | G06F 16/211 |
| 11,138,203 B2* | 10/2021 | Christie | G06F 16/2246 |
| 2006/0161635 A1 | 7/2006 | Lamkin et al. | |
| 2011/0145103 A1* | 6/2011 | Ljunggren | G06Q 30/04 709/217 |
| 2011/0276691 A1* | 11/2011 | Jou | G06F 16/9566 709/245 |
| 2016/0164825 A1* | 6/2016 | Riedel | H04L 43/026 709/223 |

(Continued)

OTHER PUBLICATIONS

3rd Generation Partnership Project; Technical Specification Group Services and System Aspects; 5G Media Streaming (5GMS); Protocols—3GPP TS 26.512 (Year: 2020).*

(Continued)

*Primary Examiner* — Younes Naji
(74) *Attorney, Agent, or Firm* — Sughrue Mion, PLLC

(57) ABSTRACT

A method, computer program, and computer system is provided for media content preparation for 5G networks. A reverse address mapping process for 5G media streaming associated with a content preparation process is identified. A media content address is calculated based on the identified reverse address mapping process. A workflow is generated for the content preparation process based on the calculated media content address. 5G media streaming content preparation is performed according to the workflow of the content preparation process.

17 Claims, 8 Drawing Sheets

(56) References Cited

U.S. PATENT DOCUMENTS

2021/0022024 A1    1/2021   Yao et al.

OTHER PUBLICATIONS

"3rd Generation Partnership Project; Technical Specification Group Services and System Aspects; 5G Media Streaming (5GMS); General description and architecture (Release 16)", 3GPP TS 26.501 V16.6.1, Jan. 2021 (79 pages total).
"3rd Generation Partnership Project; Technical Specification Group Services and System Aspects; 5G Media Streaming (5GMS); Protocols (Release 16)", 3GPP TS 26.512 V16.1.0, Dec. 2020 (96 pages total).
International Search Report dated Jan. 14, 2022 in International Application No. PCT/US21/54563.
Written Opinion ofthe International Searching Authority dated Jan. 14, 2022 in International Application No. PCT/US21/54563.

\* cited by examiner

METHOD AND APPARATUS FOR REVERSE ADDRESS MAPPING WHEN USING CONTENT PREPARATION IN 5G NETWORKS

CROSS-REFERENCE TO RELATED APPLICATION

This application claims priority from U.S. Provisional Patent Application No. 63/168,969 (filed Mar. 31, 2021) in the U.S. Patent and Trademark Office, the entirety of which is herein incorporated by reference.

FIELD

This disclosure relates generally to field of data processing, and more particularly to 5G networks.

BACKGROUND

3GPP TS26.512 defines the concept of a content preparation template to set up the processing of the media streams before hosting the content for streaming. It also defines the content hosting configuration for the distribution of the content.

SUMMARY

Embodiments relate to a method, system, and computer readable medium for content preparation for 5G networks. According to one aspect, a method for content preparation for 5G networks is provided. The method may include identifying a reverse address mapping process associated with a content preparation process. A media content address is calculated based on the identified reverse address mapping process. A workflow is generated for the content preparation process based on the calculated media content address.

According to another aspect, a computer system for media content preparation for 5G networks is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include identifying a reverse address mapping process associated with a content preparation process for 5G media streaming. A media content address is calculated based on the identified reverse address mapping process. A workflow is generated for the content preparation process based on the calculated media content address. 5G media streaming content preparation is performed according to the workflow for the content preparation process.

According to yet another aspect, a computer readable medium for media content preparation for 5G networks is provided. The computer readable medium may include one or more computer-readable storage devices and program instructions stored on at least one of the one or more tangible storage devices, the program instructions executable by a processor. The program instructions are executable by a processor for performing a method that may accordingly include identifying a reverse address mapping process associated with a content preparation process for 5G media streaming. A media content address is calculated based on the identified reverse address mapping process. A workflow is generated for the content preparation process based on the calculated media content address. 5G media streaming content preparation is performed according to the workflow for the content preparation process.

BRIEF DESCRIPTION OF THE DRAWINGS

These and other objects, features and advantages will become apparent from the following detailed description of illustrative embodiments, which is to be read in connection with the accompanying drawings. The various features of the drawings are not to scale as the illustrations are for clarity in facilitating the understanding of one skilled in the art in conjunction with the detailed description. In the drawings.

DETAILED DESCRIPTION

Figure 1:
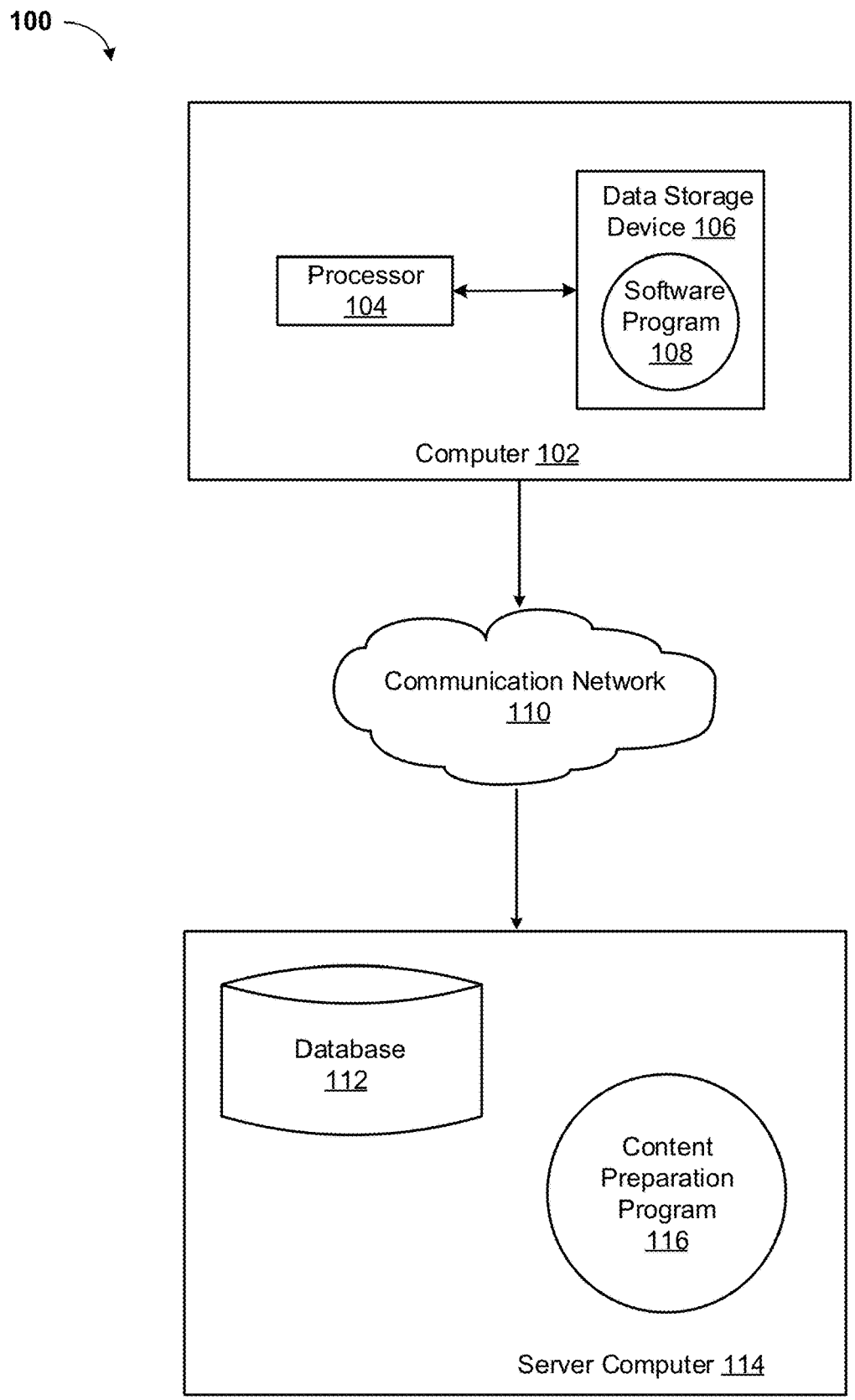
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. Those structures and methods may, however, be embodied in many different forms and should not be construed as limited to the exemplary embodiments set forth herein. Rather, these exemplary embodiments are provided so that this disclosure will be thorough and complete and will fully convey the scope to those skilled in the art. In the description, details of well-known features and techniques may be omitted to avoid unnecessarily obscuring the presented embodiments.

Embodiments relate generally to the field of data processing, and more particularly to 5G networks. The following described exemplary embodiments provide a system, method and computer program for, among other things, content preparation for 5G networks. Therefore, some embodiments have the capacity to improve the field of computing by allowing for a reverse address mapping for a content preparation process for 5G networks to be defined.

As previously described, 3GPP TS26.512 defines the concept of a content preparation template to set up the processing of the media streams before hosting the content for streaming. It also defines the content hosting configuration for the distribution of the content. The current 5G media streaming architecture defined in 3GPP TS26.501 only defines the general architecture for uplink and downlink media streaming. 3GPP TS26.512 defines the concept of a content preparation template (CPT) to prepare received content for downlink streaming. However, it doesn't define the process for the content miss with content preparation It may be advantageous, therefore, to use reverse address mapping on the content preparation process.

A 5G media streaming (5GMS) system may be an assembly of application functions, application servers, and interfaces from the 5G media streaming architecture that support either downlink media streaming services or uplink media streaming services, or both. A 5GMS Application Provider may include a party that interacts with functions of the 5GMS system and supplies a 5GMS Aware Application that interacts with functions of the 5GMS system. The 5GMS Aware Application may refer to an application in the user equipment (UE), provided by the 5GMS Application Provider, that contains the service logic of the 5GMS application service, and interacts with other 5GMS Client and Network functions via the interfaces and application programming interfaces (APIs) defined in the 5GMS architecture. A 5GMS Client may refer to a UE function that is either a 5GMS downlink (5GMSd) Client or a 5GMS uplink (5GMSu) Client, or both.

The 5GMSd Client may refer to a UE function that includes at least a 5G media streaming player and a media session handler for downlink streaming and that may be accessed through well-defined interfaces/APIs. The 5GMSu Client may refer to an originator of a 5GMSu service that may be accessed through well-defined interfaces/APIs. A 5GMSu media streamer may refer to a UE function that enables uplink delivery of streaming media content to an Application Server (AS) function of the 5GMS Application Provider, and which interacts with both the 5GMSu Aware Application for media capture and subsequent streaming, and the Media Session Handler for media session control.

A dynamic policy may refer to a dynamic policy and charging control (PCC) rule for an uplink or downlink application flow during a media session. An egest session may refer to an uplink media streaming session from the 5GMS AS towards the 5GMSu Application Provider. An ingest session may refer to a session to upload the media content to a 5GMSd AS. A policy template may refer to a collection of (semi-static) Policy or Control Function (PCF)/ Network Exposure Function (NEF) API parameters which are specific to the 5GMS Application Provider and also the resulting PCC rule. A policy template ID may identify the desired policy template, which is used by the 5GMSd Application Function (AF) to select the appropriate PCF/ NEF API towards the 5G system so that the PCF can compile the desired PCC rule. The Media Player Entry may refer to a document or a pointer to a document that defines a media presentation (e.g., a media presentation description (MPD) for DASH or a uniform resource locator (URL) to a video clip file). A Media Streamer Entry may refer to a pointer (e.g., in the form of a URL) that defines an entry point of an uplink media streaming session. A presentation entry may refer to a document or a pointer to a document that defines an application presentation, such as an HTML5 document.

A Provisioning Session may refer to a data structure supplied at an interface (Mid) by a 5GMSd Application provider that configures the 5GMSd features relevant to a set of 5GMSd Aware Applications. A 5GMSd Media Player may refer to a UE function that enables playback and rendering of a media presentation based on a media play entry and exposing some basic controls such as play, pause, seek, stop, to the 5GMSd Aware Application. Server Access Information may refer to a set of parameters and addresses (including 5GMSd AF and 5GMSd AS addresses) which are needed to activate the reception of a streaming session. A Service and Content Discovery may refer to functionality and procedures provided by a 5GMSd Application Provider to a 5GMS Aware Application that enables the end user to discover the available streaming service and content offerings and select a specific service or content item for access. A Service Announcement may refer to procedures conducted between the 5GMS Aware Application and the 5GMS Application Provider such that the 5GMS Aware Application is able to obtain 5GMS Service Access Information, either directly or in the form of a reference to that information.

A third party player may refer to a part of an application that uses APIs to exercise selected 5GMSd functions to play back media content. A third party uplink streamer may refer to a part of an application that uses APIs to exercise selected 5GMSu functions to capture and stream media content.

Aspects are described herein with reference to flowchart illustrations and/or block diagrams of methods, apparatus (systems), and computer readable media according to the various embodiments. It will be understood that each block of the flowchart illustrations and/or block diagrams, and combinations of blocks in the flowchart illustrations and/or block diagrams, can be implemented by computer readable program instructions.

Referring now to FIG. 1, a functional block diagram of a networked computer environment illustrating a content preparation system 100 (hereinafter "system") for content preparation for 5G networks. It should be appreciated that FIG. 1 provides only an illustration of one implementation and does not imply any limitations with regard to the environments in which different embodiments may be implemented. Many modifications to the depicted environments may be made based on design and implementation requirements.

The system 100 may include a computer 102 and a server computer 114. The computer 102 may communicate with the server computer 114 via a communication network 110 (hereinafter "network"). The computer 102 may include a processor 104 and a software program 108 that is stored on a data storage device 106 and is enabled to interface with a user and communicate with the server computer 114. As will be discussed below with reference to FIG. 4 the computer 102 may include internal components 800A and external components 900A, respectively, and the server computer 114 may include internal components 800B and external components 900B, respectively. The computer 102 may be, for example, a mobile device, a telephone, a personal digital assistant, a netbook, a laptop computer, a tablet computer, a desktop computer, or any type of computing devices capable of running a program, accessing a network, and accessing a database.

The server computer 114 may also operate in a cloud computing service model, such as Software as a Service (SaaS), Platform as a Service (PaaS), or Infrastructure as a Service (IaaS), as discussed below with respect to FIGS. 5 and 6. The server computer 114 may also be located in a cloud computing deployment model, such as a private cloud, community cloud, public cloud, or hybrid cloud.

The server computer 114, which may be used for content preparation for 5G networks is enabled to run a Content Preparation Program 116 (hereinafter "program") that may interact with a database 112. The Content Preparation Program method is explained in more detail below with respect to FIG. 3. In one embodiment, the computer 102 may operate as an input device including a user interface while the program 116 may run primarily on server computer 114. In an alternative embodiment, the program 116 may run primarily on one or more computers 102 while the server computer 114 may be used for processing and storage of data used by the program 116. It should be noted that the program 116 may be a standalone program or may be integrated into a larger content preparation program.

It should be noted, however, that processing for the program 116 may, in some instances be shared amongst the computers 102 and the server computers 114 in any ratio. In another embodiment, the program 116 may operate on more than one computer, server computer, or some combination of computers and server computers, for example, a plurality of computers 102 communicating across the network 110 with a single server computer 114. In another embodiment, for example, the program 116 may operate on a plurality of server computers 114 communicating across the network 110 with a plurality of client computers. Alternatively, the program may operate on a network server communicating across the network with a server and a plurality of client computers.

The network 110 may include wired connections, wireless connections, fiber optic connections, or some combination thereof. In general, the network 110 can be any combination of connections and protocols that will support communications between the computer 102 and the server computer 114. The network 110 may include various types of networks, such as, for example, a local area network (LAN), a wide area network (WAN) such as the Internet, a telecommunication network such as the Public Switched Telephone Network (PSTN), a wireless network, a public switched network, a satellite network, a cellular network (e.g., a fifth generation (5G) network, a long-term evolution (LTE) network, a third generation (3G) network, a code division multiple access (CDMA) network, etc.), a public land mobile network (PLMN), a metropolitan area network (MAN), a private network, an ad hoc network, an intranet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of system 100 may perform one or more functions described as being performed by another set of devices of system 100.

Figure 2A:
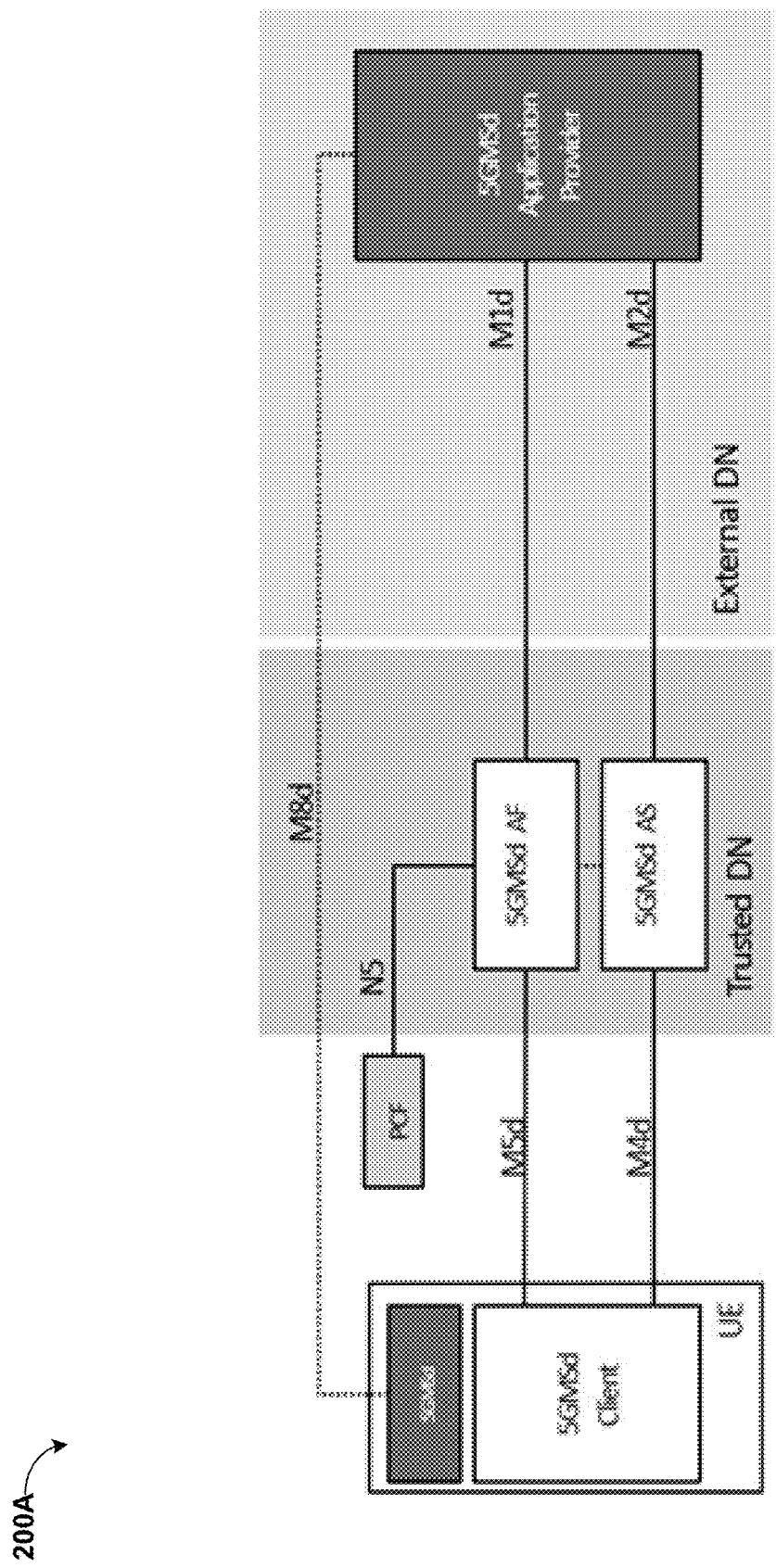
FIG. 2A is a diagram of content preparation before downlink streaming, according to at least one embodiment.

Referring now to FIG. 2A, a diagram 200A of content preparation before downlink streaming is depicted. In a collaboration use case, the 5GMSd Application Provider requests content preparation for its stream before distribution. In a use case of downloading without content preparation, the content is provided by the Application Provider through M2d. M2d refers to a 5GMSd Ingest API. It is an optional external API exposed by the 5GMSd AS and is used when the 5GMSd AS in the trusted data network is selected to host content for the streaming service. One option is to pull the content from Application Provider using the HTTP pull-based ingest protocol defined in 3GPP TS26.512. If the content is ready for distribution, the distribution happens based on Content Hosting Configuration Template (HCT) set by the Application Provider. In this use case, when the content is requested by the client, if it is available on 5GMSd AS, it is delivered to the client. However, if the content is not available or missing, then corresponding original content is requested from Application Provider. 3GPP TS26.512 defines a simple rewriting process for building the address of the original content from the requested content address by the client. This rewriting process results in one URL address.

In a use case of downloading with content preparation, the content is provided by the Application Provider through M2d. One option is to pull the content from Application Provider using the HTTP pull-based ingest protocol. Then the content is prepared for distribution as defined in the Content Preparation Template (CPT) and last, the distribution happens based on Content Hosting Configuration Template (HCT), both set by the Application Provider. In this use case, when the content is requested by the client, if it is available on 5GMSd AS, it is delivered to the client. However, if the content is not available or missing, then corresponding original content that is needed for content preparation must be requested from Application Provider. If there is a simple mapping rule between the requested content and the original content, the path rewrite rules of 3GPP TS26.512 can be used. However, if the content creation is more complex, for instance, it uses multiple original contents, then the path rewrite may not address the generation of the required multiple pieces of the original content.

Figure 2B:
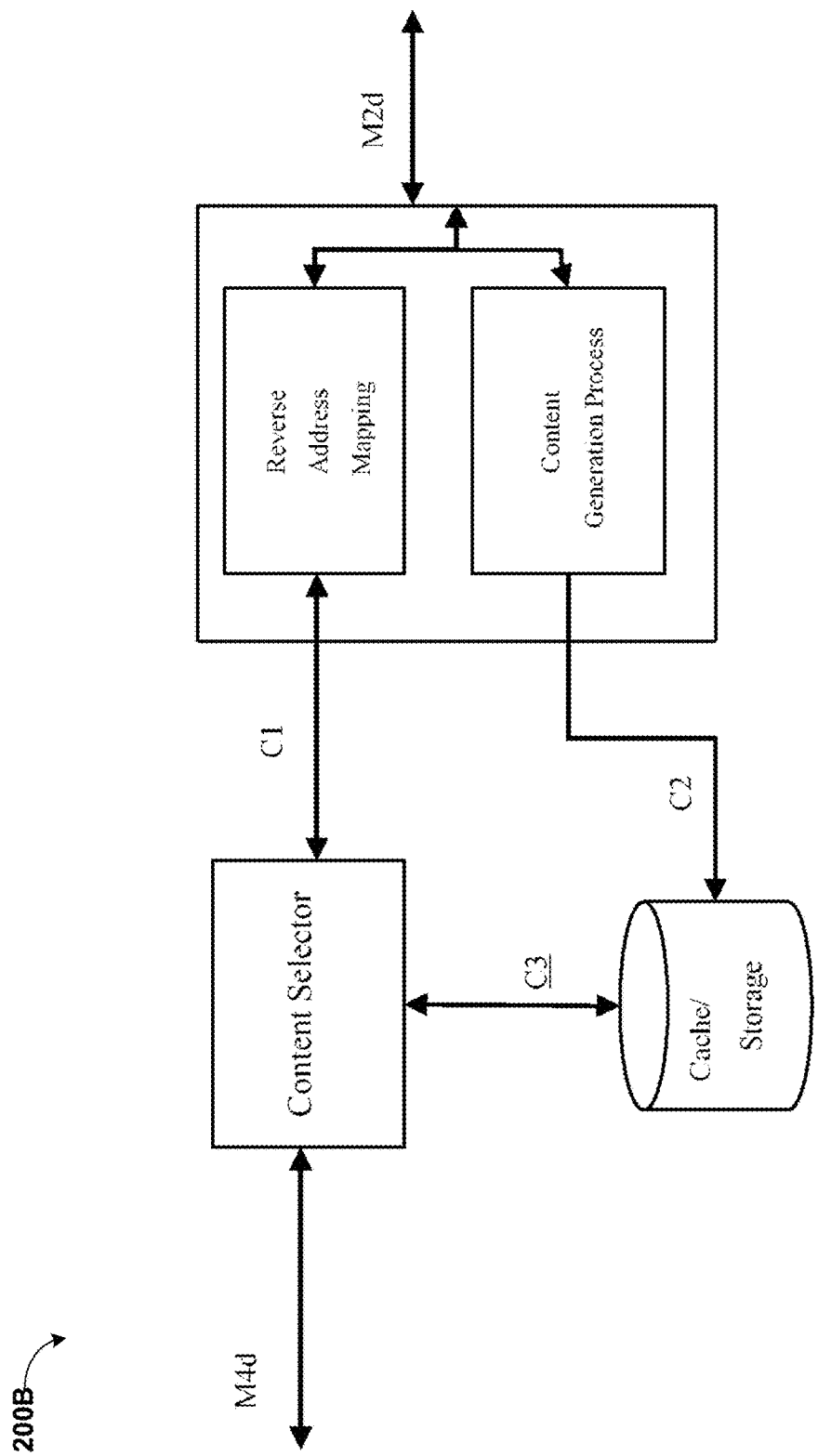
FIG. 2B is a diagram of addressing missing content using content preparation mapping, according to at least one embodiment.

Referring now to FIG. 2B, a diagram 200B of addressing missing content using content preparation mapping is depicted. Using reverse address mapping as part of the content preparation template may provide a more comprehensive solution for calculating the required content pulls in the case when a client requests content that is missing. In this approach, the content is requested by the client. The content selector requests the content from the cache and/or storage. If the content is available, it is delivered to the client by the M4d interface. However, if it is missing, the content selector requests the content preparation process (CPP). The CPP has two parts: Content Generation Process (CGP) for processing the input content and provides the outputs to the cache/storage and Reverse Address Mapping (RAM) for mapping the client URL request to one or more URLs and makes the requests through M2d.

Figure 2C:
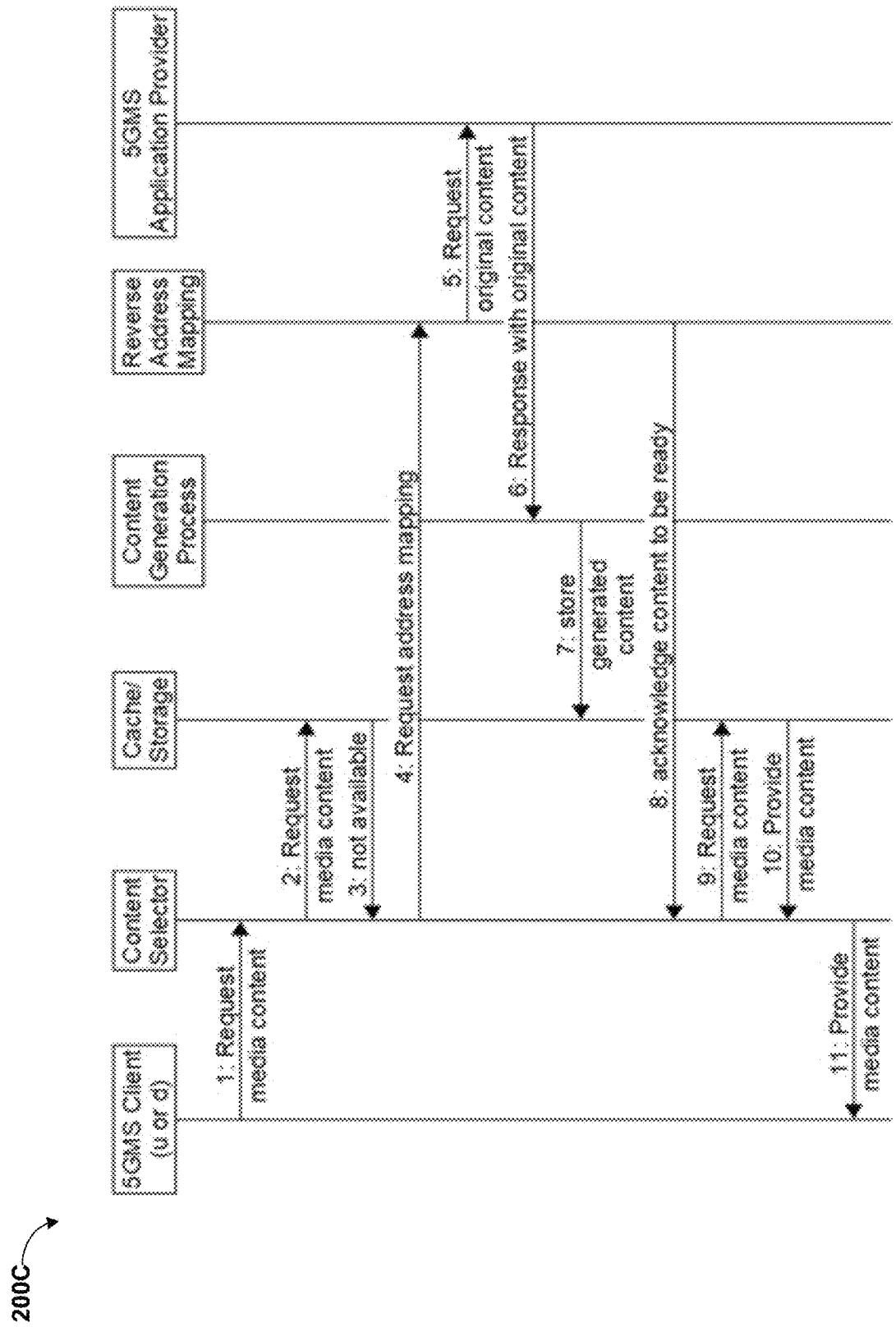
FIG. 2C is a diagram of a call-flow when content is not available or missing in the storage, according to at least one embodiment.

Referring now to FIG. 2C, a diagram 200C of a call-flow when content is not available or missing in the storage is depicted. The call-flow may define a process when a client request for content is missing from the cache and/or storage. In this design, the reverse address mapping is part of the content preparation process, and therefore can be defined by the content preparation template and in its format. Since the content preparation template might have a different format, the reverse address mapping is also defined in the corresponding format. Using content preparation templates with multiple inputs may allow for address mapping for each input to be performed if the content preparation template defines multiple inputs.

Using cascading content preparation templates may allow for the address mapping to be performed in a set of serial operations if the content preparation template is cascaded. In this case, if the content preparation process 1, 2, . . . , N are cascaded, one after another, then reverse address mapping would be performed in a cascaded fashion of applying the reverse address mapping of content preparation template N, N–1, . . . , 1 in this order.

When using workflows of content preparation templates in more complex setups, a workflow can be built using multiple content preparation templates (CPT), when some of the CPTs have multiple inputs. In this case, the address mapping can be performed by back-propagation of the reverse address mappings, starting from the last CPT and calculating back in order the input addresses Referring now to FIG. 3, an operational flowchart illustrating the steps of a method 300 carried out by a program for content preparation in 5G networks is depicted.

At 302, the method 300 may include identifying a reverse address mapping process associated with a content preparation process.

At 304, the method 300 may include calculating a media content address based on the identified reverse address mapping process.

At 306, the method 300 may include generating a workflow for the content preparation process based on the calculated media content address.

Figure 3:
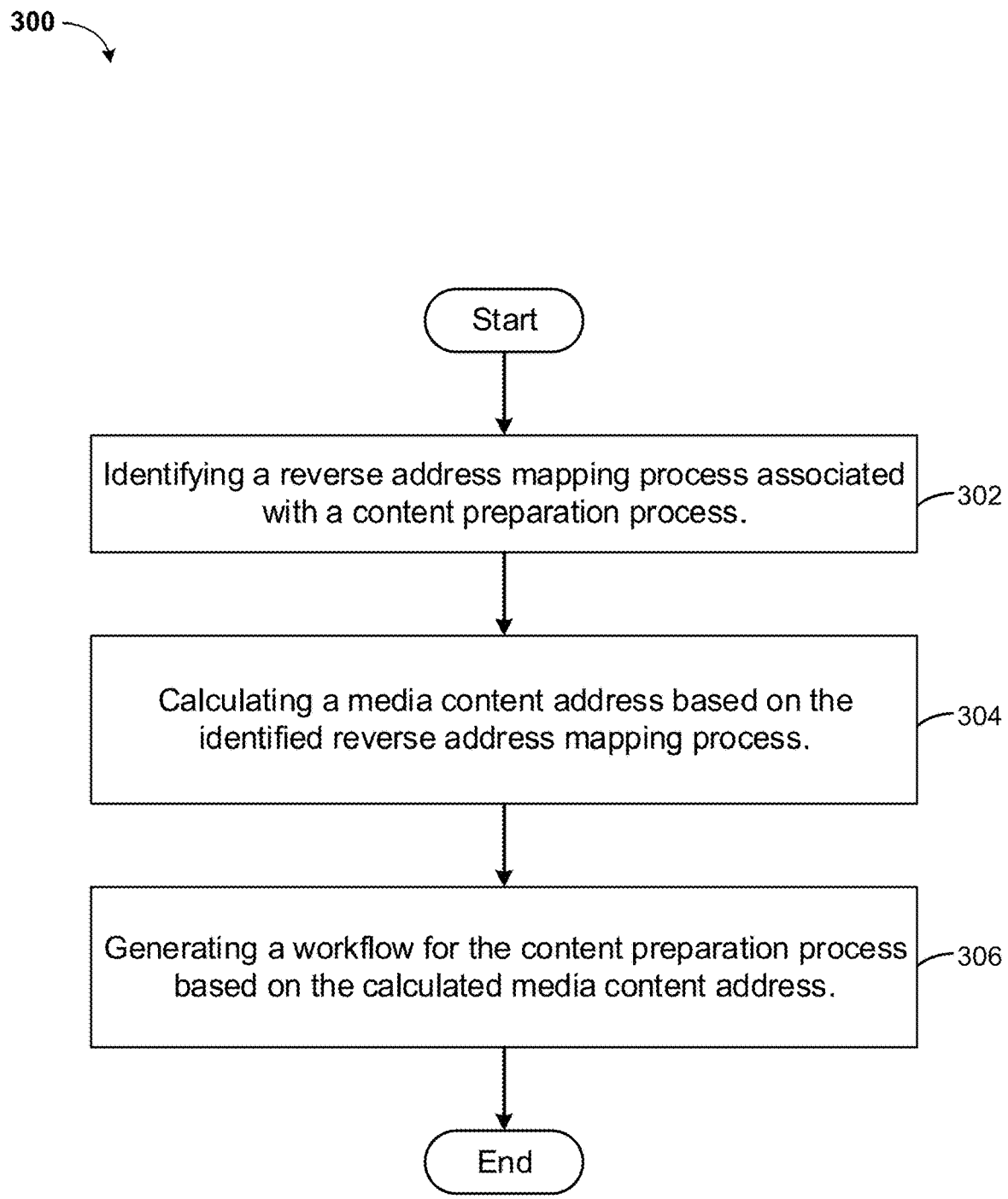
FIG. 3 is an operational flowchart illustrating the steps carried out by a program for content preparation for 5G networks, according to at least one embodiment.

It may be appreciated that FIG. 3 provides only an illustration of one implementation and does not imply any limitations with regard to how different embodiments may be implemented. Many modifications to the depicted environments may be made based on design and implementation requirements.

Figure 4:
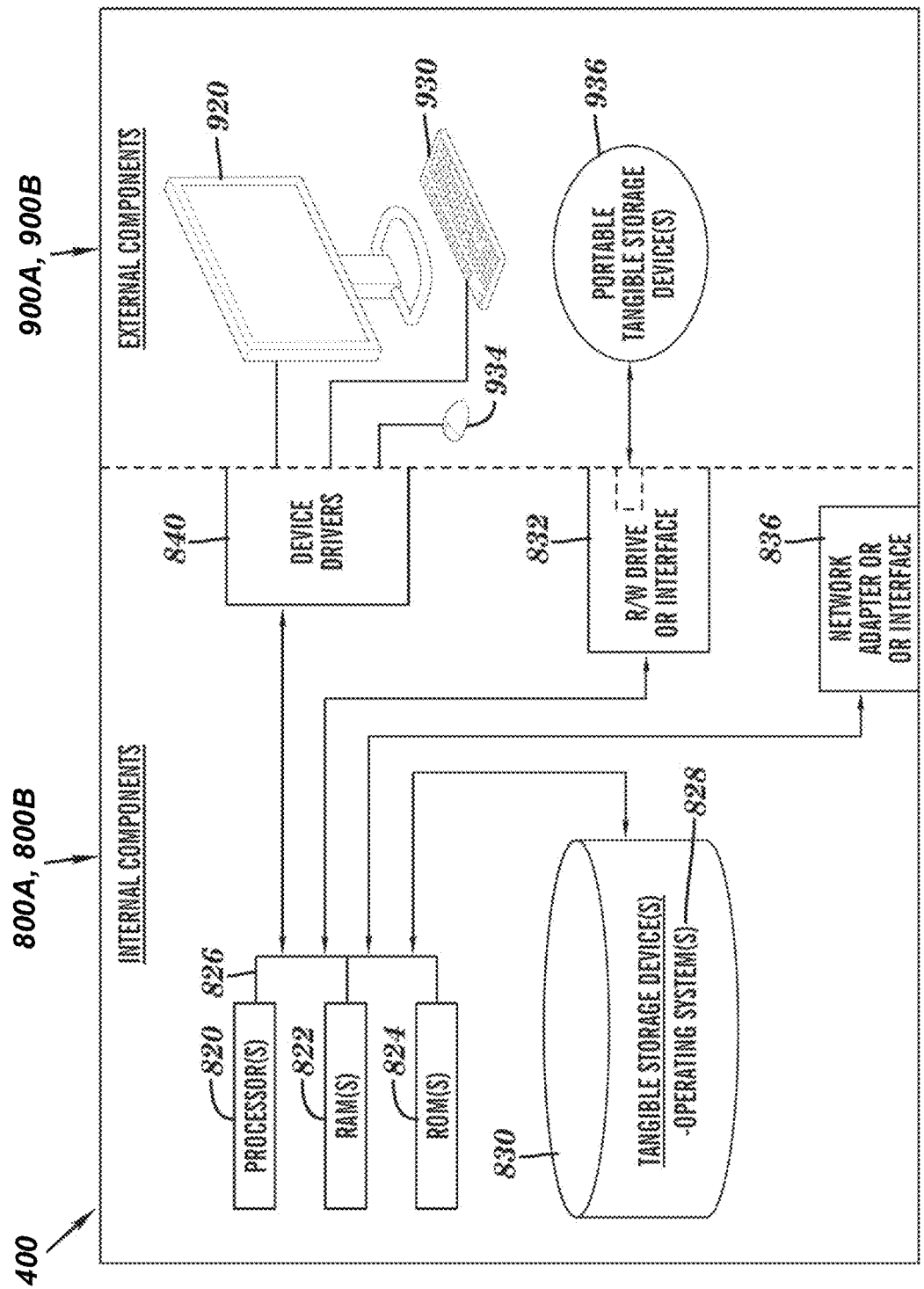
FIG. 4 is a block diagram of internal and external components of computers and servers depicted in FIG. 1 according to at least one embodiment.

FIG. 4 is a block diagram 400 of internal and external components of computers depicted in FIG. 1 in accordance with an illustrative embodiment. It should be appreciated that FIG. 4 provides only an illustration of one implementation and does not imply any limitations with regard to the environments in which different embodiments may be implemented. Many modifications to the depicted environments may be made based on design and implementation requirements.

Figure 5:
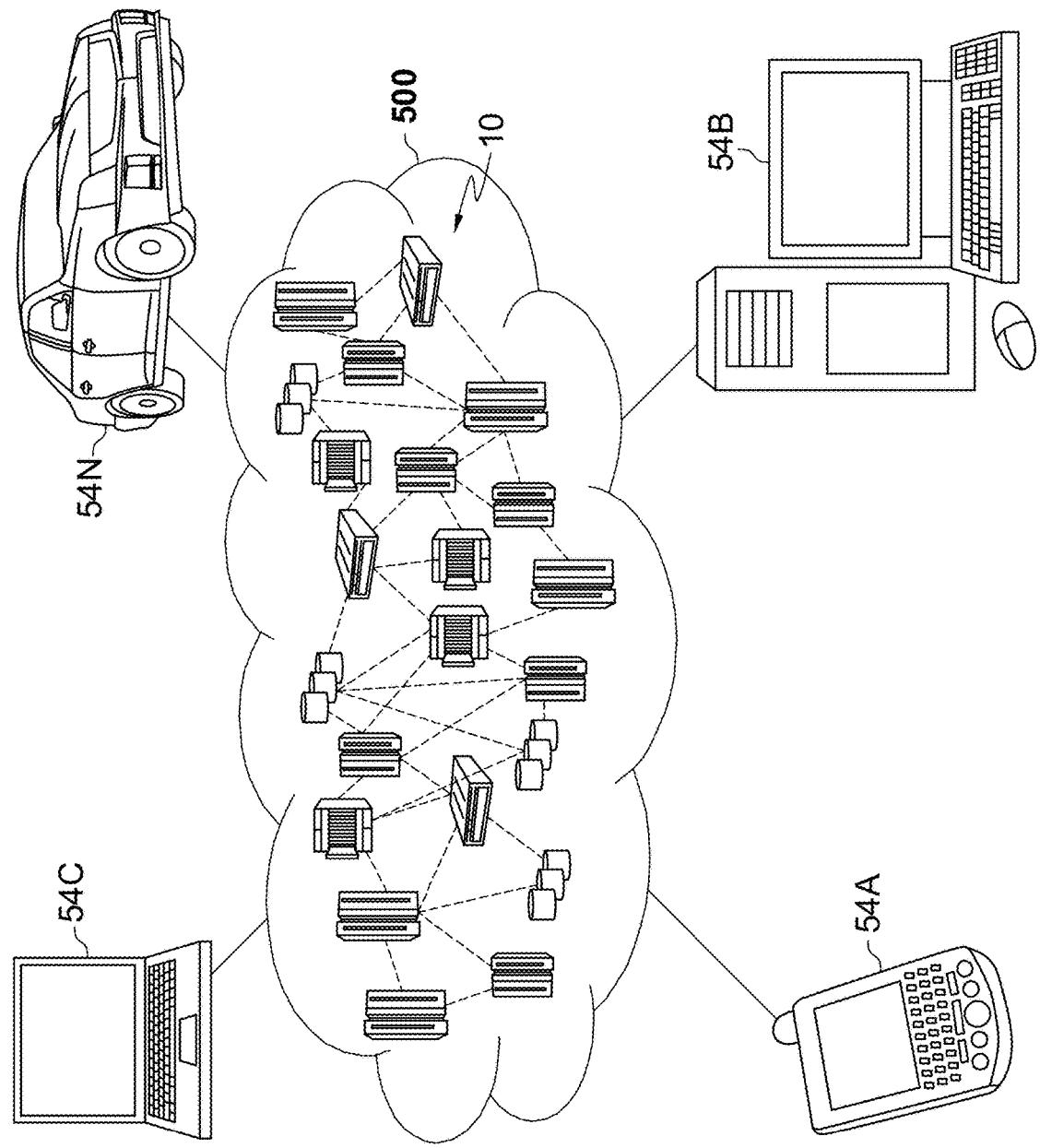
FIG. 5 is a block diagram of an illustrative cloud computing environment including the computer system depicted in FIG. 1, according to at least one embodiment.

Computer 102 (FIG. 1) and server computer 114 (FIG. 1) may include respective sets of internal components 800A,B and external components 900A,B illustrated in FIG. 5. Each of the sets of internal components 800 include one or more processors 820, one or more computer-readable RAMs 822 and one or more computer-readable ROMs 824 on one or more buses 826, one or more operating systems 828, and one or more computer-readable tangible storage devices 830.

Processor 820 is implemented in hardware, firmware, or a combination of hardware and software. Processor 820 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 820 includes one or more processors capable of being programmed to perform a function. Bus 826 includes a component that permits communication among the internal components 800A,B.

The one or more operating systems 828, the software program 108 (FIG. 1) and the Content Preparation Program 116 (FIG. 1) on server computer 114 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory, an optical disk, a magneto-optic disk, a solid state disk, a compact disc (CD), a digital versatile disc (DVD), a floppy disk, a cartridge, a magnetic tape, and/or another type of non-transitory computer-readable tangible storage device that can store a computer program and digital information.

Each set of internal components 800A,B also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the software program 108 (FIG. 1) and the Content Preparation Program 116 (FIG. 1) can be stored on one or more of the respective portable computer-readable tangible storage devices 936, read via the respective R/W drive or interface 832 and loaded into the respective hard drive 830.

Each set of internal components 800A,B also includes network adapters or interfaces 836 such as a TCP/IP adapter cards; wireless Wi-Fi interface cards; or 3G, 4G, or 5G wireless interface cards or other wired or wireless communication links. The software program 108 (FIG. 1) and the Content Preparation Program 116 (FIG. 1) on the server computer 114 (FIG. 1) can be downloaded to the computer 102 (FIG. 1) and server computer 114 from an external computer via a network (for example, the Internet, a local area network or other, wide area network) and respective network adapters or interfaces 836. From the network adapters or interfaces 836, the software program 108 and the Content Preparation Program 116 on the server computer 114 are loaded into the respective hard drive 830. The network may comprise copper wires, optical fibers, wireless transmission, routers, firewalls, switches, gateway computers and/or edge servers.

Each of the sets of external components 900A,B can include a computer display monitor 920, a keyboard 930, and a computer mouse 934. External components 900A,B can also include touch screens, virtual keyboards, touch pads, pointing devices, and other human interface devices. Each of the sets of internal components 800A,B also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, some embodiments are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring to FIG. 5, illustrative cloud computing environment 500 is depicted. As shown, cloud computing environment 500 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 54A-N shown in FIG. 5 are intended to be illustrative only and that cloud computing nodes 10 and cloud computing environment 500 can communicate with any type of computerized device over any type of network and/or network addressable connection (e.g., using a web browser).

Figure 6:
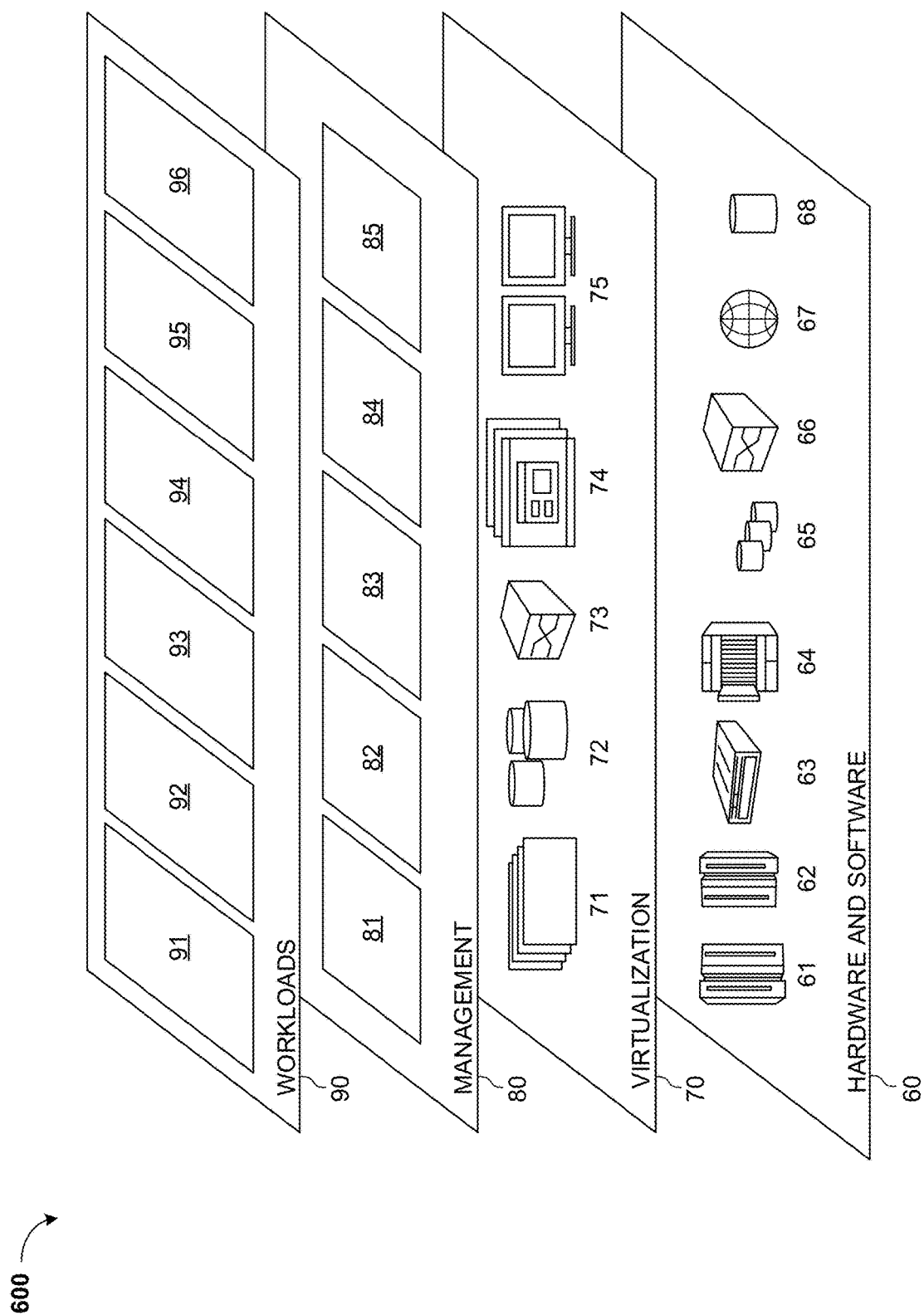
FIG. 6 is a block diagram of functional layers of the illustrative cloud computing environment of FIG. 5, according to at least one embodiment.

Referring to FIG. 6, a set of functional abstraction layers 600 provided by cloud computing environment 500 (FIG. 5) is shown. It should be understood in advance that the components, layers, and functions shown in FIG. 6 are intended to be illustrative only and embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and Content Preparation 96. Content Preparation 96 may define a reverse address mapping for a content preparation process for 5G networks.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of media content preparation for 5G networks by a 5G media streaming system (5GMS), executable by a processor, comprising:
    identifying a reverse address mapping process associated with a content preparation process for 5G media streaming,
        wherein the reverse address mapping process is in a same format as a format of an associated content preparation template, wherein the content preparation process is a cascade of content preparation processes, and wherein the reverse address mapping process includes one or more cascaded reverse address mapping processes used in the cascade of content preparation processes;
    calculating a media content address based on the identified reverse address mapping process; generating a workflow for the content preparation process based on the calculated media content address; and
    performing 5G media streaming content preparation according to the workflow for the content preparation process.

2. The method of claim 1, wherein the media content address is calculated based on an output content address associated with the associated content preparation template.

3. The method of claim 2, further comprising generating requested output content based on calculating one or more original content addresses associated with the content preparation process.

4. The method of claim 3, wherein the associated content preparation template is configured to define a mapping of an output content address to the one or more original content addresses.

5. The method of claim 1, wherein a back-propagated reverse address mapping is used in one or more workflows associated with the cascade of content preparation processes.

6. The method of claim 1, further comprising processing output content by a content preparation process from among the cascade of content preparation processes.

7. A computer system for media content preparation for 5G networks,
    the computer system comprising:
        one or more computer-readable non-transitory storage media configured to store computer program code; and
        one or more computer processors configured to access said computer program code and operate as instructed by said computer program code, said computer program code including:
            identifying code configured to cause the one or more computer processors to identify a reverse address mapping process associated with a content preparation process for 5G media streaming,
                wherein the reverse address mapping process is in a same format as a format of an associated content preparation template, wherein the content preparation process is a cascade of content preparation processes, and wherein the reverse address mapping process includes one or more cascaded reverse address mapping processes used in the cascade of content preparation processes;
            calculating code configured to cause the one or more computer processors to calculate a media content address based on the identified reverse address mapping process;
            generating code configured to cause the one or more computer processors to generate a workflow for the content preparation process based on the calculated media content address; and
            performing code configured to cause the one or more computer processors to perform 5G media streaming content preparation according to the workflow for the content preparation process.

8. The computer system of claim 7, wherein the media content address is calculated based on an output content address associated with the associated content preparation template.

9. The computer system of claim 8, further comprising generating code configured to cause the one or more computer processors to generate requested output content based on calculating one or more original content addresses associated with the content preparation process.

10. The computer system of claim 9, wherein the associated content preparation template is configured to define a mapping of an output content address to the one or more original content addresses.

11. The computer system of claim 7, wherein a back-propagated reverse address mapping is used in one or more workflows associated with the cascade of content preparation processes.

12. The computer system of claim 7, wherein the computer program is further configured to cause one or more computer processors to process output content by a content preparation process from among the cascade of content preparation processes.

13. A non-transitory computer readable medium having stored thereon a computer program for media content preparation for 5G networks, the computer program configured to cause one or more computer processors to:
- identify a reverse address mapping process associated with a content preparation process for 5G media streaming,
  - wherein the reverse address mapping process is in a same format as a format of an associated content preparation template, wherein the content preparation process is a cascade of content preparation processes, and wherein the reverse address mapping process includes one or more cascaded reverse address mapping processes used in the cascade of content preparation processes;
- calculate a media content address based on the identified reverse address mapping process;
- generate a workflow for the content preparation process based on the calculated media content address; and
- perform 5G media streaming content preparation according to the workflow for the content preparation process.

14. The computer readable medium of claim 13, wherein the media content address is calculated based on an output content address associated with the associated content preparation template.

15. The computer readable medium of claim 14, wherein the computer program is further configured to cause one or more computer processors to generate requested output content based on calculating one or more original content addresses associated with the content preparation process.

16. The computer readable medium of claim 15, wherein the associated content preparation template is configured to define how to map an output content address to the one or more original content addresses.

17. The computer readable medium of claim 13, wherein a back-propagated reverse address mapping is used in one or more workflows associated with the cascade of content preparation processes.

* * * * *